Patented June 19, 1945

2,378,745

UNITED STATES PATENT OFFICE 2,378,745

PREPARATION OF TETRA-ALPHA-CHLORO-ANTHRAQUINONE

Earl E. Beard, Wilmington, Del., assignor to E. I. du Pont de Nemours & Company, Wilmington, Del., a corporation of Delaware No Drawing. Application April 8, 1942, Serial No. 438,150

6 Claims. (Cl. 260—384)

This invention relates to a process for preparing tetra-alpha-chloroanthraquinone and has for its object an improvement in the process for chlorinating anthraquinone to produce 1,4,5,8-tetra-chloroanthraquinone in relatively high yields and purity.

Because of the difficulty heretofore experienced in the direct chlorination of anthraquinone to produce 1,4,5,8-tetra-chloroanthraquinone of high purity, this product has generally been prepared by the chlorination of nitroanthraquinones in which the nitro groups have a directive influence on the chlorination and are themselves replaced during the chlorination process. The methods at present employed for the preparation of 1,4,5,8-tetra-chloroanthraquinone are relatively expensive and therefore it is the object of this invention to provide a process for preparing 1,4,5,8-tetrachloroanthraquinone in good yields and of a purity suitable for use in the manufacture of dyes, particularly the penta-anthrimide carbazole of U. S. P. 2,028,103, at a much lower cost than that at which it has been heretofore produced.

I have found that if the chlorination of anthraquinone is carried out at temperatures of from 25 to 55° C. in sulfuric acid which contains free sulfur trioxide equivalent to not less than approximately 2.3 moles per mole of anthraquinone to be chlorinated and the chlorination is carefully controlled so that an isolated test sample of chlorinated material does not contain over approximately 36% chlorine a relatively high yield of 1,4,5,8-tetrachloroanthraquinone can be obtained free from higher chlorination bodies and which is particularly suitable for the manufacture of the penta-anthrimide carbazole of U. S. P. 2,028,103. This tetrachloroanthraquinone is isolated from the chlorination mass by precipitating it from sulfuric acid of carefully controlled acidity between 92-98% acid. The under chlorinated anthraquinone bodies that are isolated in the filtrate from this acid purification can be subjected to re-chlorination and are therefore not lost in the process, so that the overall conversion of starting material to the desired intermediate is high.

This chlorination procedure may be carried out on previously purified anthraquinone or it may be carried out on the anthraquinone obtained from the ring closure of ortho-benzoyl-benzoic acid and without isolation from the ring closure reaction mass. The ring closure of the ortho-benzoyl-benzoic acid is carried out in general according to the processes disclosed in the prior art in sulfuric acid of from 100% to 65% oleum. Since in the chlorination step it has been found that the volume of acid should not be too large for economical working, the ring closure of the ortho-benzoylbenzoic acid in this process is preferably carried out in from 2 to 6 parts of sulfuric acid per part of ortho-benzoyl-benzoic acid at temperatures of from 85 to 135° C.

In the chlorination of the anthraquinone, either purified or as obtained in the ring closure of ortho-benzoyl-benzoic acid, it has been found that from 2.5 to 6 parts of acid (100%) per part of anthraquinone can be employed. The smaller amounts of the acid relative to the amount of anthraquinone being worked are desirable so that during the chlorination the tetrachloroanthraquinone will be precipitated out as fast as formed and thereby reduce the chance of over-chlorination. The lower limit in the amount of acid employed will depend upon the amount necessary to permit proper agitation of the reaction mass. Approximately 3.6 parts of sulfuric acid monohydrate per part of anthraquinone has been found to give very satisfactory results. With larger amounts of acid it is impossible to prevent the formation of higher chlorinated bodies as impurities, so that when over six parts of sulfuric acid are employed the 1,4,5,8-tetrachloroanthraquinone obtained is of noticeably inferior quality. The quantity of this desired product is also reduced due to over-chlorination of some of the starting material.

The chlorination is carried out in the sulfuric acid containing at least 2.3 moles of $SO_3$ per mole of anthraquinone under-treatment and this quantity is used irrespective of the particular volume of acid employed. With less sulfur trioxide present in the chlorination mass a longer time is required to complete the chlorination. To permit proper control of the chlorination and prevent over-chlorination the amount of sulfur trioxide present in the acid should not be more than three moles per mole of anthraquinone. Although it is possible to use as much, for example, as ten moles of sulfur trioxide, the use of the larger amount is objectionable since it becomes increasingly difficult to stop the chlorination at the desired point. Further, the use of the larger amounts of sulfur trioxide is unnecessary and adds to the cost of the process.

To prevent the formation of over-chlorinated bodies the reaction should be carried out at between 25–55° C. The lower temperatures are preferred to permit careful control of the chlorination, for higher temperatures particularly those of 100° C. and above produce conditions which greatly favor the formation of beta-chloroanthraquinone derivatives. With temperatures as high as 55° C. the amount of sulfur trioxide in the mass should be kept in the lower limits above specified. The chlorination under the conditions as above described usually requires from 10 to 12 hours, depending on the efficiency with which the chlorine is introduced into the mass. I have found that by chlorinating under the conditions as above described, and stopping the chlorination when an isolated test sample of the chlorinated material contains not more than 36% chlorine, a very good yield of tetra-chloroanthraquinone containing substantially no higher chlorination derivatives or beta substitution products can be obtained with a minimum quantity of lower chlorination products that must be separated out in the isolation procedure. The chlorination may be stopped before the mass contains 36% chlorine and an equally good quality of tetrachloroanthraquinone can be obtained although a larger amount of lower chlorinated bodies results which require rechlorination. It has therefore been found that to prevent the reworking of an undue quantity of lower chloroanthraquinone bodies the chlorination should be carried to at least a point where the crude product analyzes 25% chlorine. In order to obtain material of good quality it is important to prevent chlorination appreciably beyond a content of 36% whereas under chlorination (i. e. to a content of 25% chlorine) reduces the yield without impairing the quality of the tetra-alpha-chloroanthraquinone which may be readily isolated. The chlorination is carried out in the presence of iodine which may be used in widely varying amounts. When chlorination has been completed the mass is run into water or a diluted sulfuric acid until the concentration of the mass is brought to from 92 to 98% sulfuric acid. The volume of the acid upon dilution is preferably kept within 8 to 12 parts of acid per part of anthraquinone originally employed. This acid suspension is then heated, or the temperature is allowed to rise during the diluting step, to 80-90° C. in order to more thoroughly expel the hydrochloric acid which has been formed. The temperature of the suspension is then adjusted to approximately room temperature and the mass is filtered. The filter cake is washed with sulfuric acid of from 92-98% strength. After further isolation as more fully described in the examples one obtains relatively pure tetrachloroanthraquinone.

The acid filtrate is then drowned in water to precipitate the lower chlorinated anthraquinones, which on filtering off can be economically subjected to further chlorination in the manner described above due to the fact that this lower chlorinated material contains substantially no beta chloro derivatives which we have found to be produced in considerable proportion when operating according to the higher temperature chlorination procedures. While the volume of the acid from which the tetrachloroanthraquinone is isolated may vary beyond the limits mentioned above, economy in the amount of acid employed has been found to be the real factor in setting the top limit, for the tetrachloroanthraquinone appears to have little solubility at ordinary temperatures in acid of from 92-98%. Sufficient acid should of course be employed to retain in solution the lower chlorinated bodies. In the preparation of very pure tetrachloroanthraquinone the acid concentration should be kept at from 92 to 98% acid and preferably at from 95 to 98%.

The following examples are given to illustrate the invention. The parts used are by weight.

Example 1

Heat a mixture of 2 parts of 100% sulfuric acid, 1 part of 65% oleum and 1 part of ortho-benzoyl-benzoic acid to 85° C. during a period of two hours, then raise the temperature to 95-98° C. and maintain at that temperature for one hour or until ring closure of the ortho-benzoyl-benzoic acid has been completed. Allow the mass to cool and add 0.01 part of iodine. After the mass attains the temperature of 40° C., pass chlorine through the agitated mass until a test sample of the chlorinated anthraquinone contains from 12-15% chlorine. Add one part of 65% oleum and the yellow-orange color of the reaction mixture now changes to a red-orange color. Continue chlorination at 40° C. until analysis shows the crude product to contain approximately 35% chlorine and the melting range of the crude product is above 245° C.

Add 1.53 parts of 100% acid to the chlorination mass, then heat to 50-60° C. and pour into 2.95 parts of 93% sulfuric acid allowing the temperature to rise to 80-85° C. After the drowning add 0.62 part of water while maintaining the temperature of 80-85° C. Reduce the temperature of the mass to 60° C. and agitate for from 3 to 5 hours. Then allow the mass to cool to ordinary room temperature and agitate for 10 to 15 hours to permit crystallization of the tetrachloroanthraquinone. Filter the mass on a stone filter and wash the filter cake with 2.21 parts of 93% sulfuric acid. Slurry the acid filter cake in water and again filter, wash acid-free with water and dry. One obtains 1.1 parts of tetra-chloroanthraquinone analyzing 40.76% chlorine and having a melting range of 301-317° C.

Drown the acid filtrate from the above reaction mass in water, filter, and wash acid free and dry. Approximately 0.28 part of chlorinated anthraquinones containing 17.69% chlorine is obtained. This product may be subjected to further chlorination by the process above described either separately or by adding it to a batch of anthraquinone to be chlorinated. It is converted to tetrachloroanthraquinone of the same purity as above described.

Example 2

Dissolve 219 parts of sublimed anthraquinone and 1.2 parts of iodine in 1100 parts of 20% oleum at 25°-40° C. Maintain agitation while bubbling chlorine through the reaction mass at 30°-40° C. for about 12 hours. An isolated sample of the chlorinated anthraquinone will now analyze 15%-25% chlorine. Add 400 parts of 20% oleum to the chlorination mass and continue the chlorination until an isolated sample analyzes 34% to 36% chlorine. Drown the reaction mass into water and isolate the chlorinated anthraquinones by filtration. Wash the filter cake with water and dry the crude acid-free product. Yield 330-340 parts. The major portion of the mixed chloroanthraquinones so obtained, is 1,4,5,8-tetrachloroanthraquinone. The latter may be obtained in a purer form by treatment of the crude product in concentrated sulfuric acid of 92 to 98%, as follows:

Agitate 1 part of the crude in 5 parts of 100% sulfuric acid and add water until the acid concentration falls to 94%-96%. Agitate 10 hours and filter at 25° C. Wash the filter cake with 1.5 to 2 parts of 95% sulfuric acid. Slurry the acid insoluble portion in water, filter the dilute acid slurry and wash the filter cake acid-free with water. The dried cake is obtained in 72% recovery from the crude and consists of 1,4,5,8-tetrachloroanthraquinone having 41.2% chlorine and a melting range not lower than 313°–320° C.

An alternate method of purification consists in the crystallization of the crude material from organic solvents such as nitrobenzene or the chlorobenzenes by dissolving in 5 parts of the solvent at elevated temperatures, cooling, filtering and removing the organic solvent by washing, steam distillation, etc. A hot alcohol extraction effects considerable purification of the crude as shown by a slightly higher chlorine content and a much higher melting point.

*Example 3*

This example illustrates the method according to which the chlorination is carried out in the presence of a small excess of sulfur trioxide at all times. In other words the necessary amount of oleum is added to the reaction mass in small portions during the chlorination step. By "necessary amount" of oleum we refer to the minimum amount of sulfur trioxide. An amount of sulfur trioxide below this minimum precludes complete chlorination, as mentioned above, at the preferred temperature of 40° C.

Dissolved 226 parts of ortho-benzoyl benzoic acid in 575 parts of 14% oleum under agitation. Heat the reaction mass to 95°–98° C. during 2 hours and maintain said temperature for 1 hour. Allow the solution of anthraquinone in sulfuric acid to cool to 40° C. and add 1.2 parts of iodine and 102 parts of 65% oleum. Maintain the agitation and a temperature of 40° C. while bubbling chlorine through the reaction mass for 5 hours. Add another portion of 102 parts of 65% oleum and again chlorinate for 5 hours. Add a third portion of 102 parts of 65% oleum and chlorinate until an isolated sample analyzes 34%–36% chlorine and melts at about 265°–300° C. If necessary to attain the specified chlorine content add a further portion of approximately 50 parts of the 65% oleum and continue the chlorination as specified. Drown the chlorinated mass into 900 parts of 75% to 85% sulfuric acid, filter the drowned mass on a carborundum filter and wash the filter cake with 500 parts of 93%–95% sulfuric acid. Then wash the cake with water until acid-free and dry the product. One obtains 210–225 parts of 1,4,5,8-tetra-chloroanthraquinone which analyzes 39%–42% chlorine and melts at 315° to 330° C.

I claim:

1. In the process for preparing tetra-alpha-chloro-anthraquinone the steps which comprise chlorinating anthraquinone containing not more than three atoms of chlorine already in alpha positions in the anthraquinone molecule in from 2.5 to 6 parts of sulfuric acid monohydrate per part of anthraquinone in which is dissolved at least 2.3 moles of sulfur trioxide per mole of anthraquinone, the chlorination being effected at temperatures below about 55° C. and the chlorination being stopped when an isolated test sample of the chlorinated material contains not more than approximately 36% chlorine.

2. The process of claim 1 in which the 1,4,5,8-tetrachloroanthraquinone is isolated from sulfuric acid of from 92–98%.

3. In the process for preparing tetra-alpha-chloroanthraquinone the steps which comprise chlorinating anthraquinone containing not more than three atoms of chlorine already in alpha positions in the anthraquinone molecule in from 2.5 to 6 parts of sulfuric acid monohydrate per part of anthraquinone in which is dissolved at least 2.3 moles of sulfur trioxide per mole of anthraquinone, the chlorination being effected at temperatures below about 55° C. and the chlorination being stopped when an isolated test sample of the chlorinated material contains not more than approximately 36% chlorine, adjusting the acid concentration of the chlorination mass to from 92 to 98% sulfuric acid concentration while the volume of the acid is maintained at from 10 to 12 parts per part of anthraquinone originally employed, and isolating the resulting 1,4,5,8-tetrachloroanthraquinone.

4. In the process for preparing tetra-alpha-chloroanthraquinone the steps which comprise chlorinating anthraquinone in approximately 3.6 parts of sulfuric acid monohydrate per part of anthraquinone in which is dissolved from 2.3 to 3 moles of sulfur trioxide per mole of anthraquinone, the chlorination being effected at temperatures of between 25° and 55° C. and the chlorination being stopped when an isolated test sample of the chlorinated material contains not more than approximately 36% chlorine.

5. In the process for preparing tetra-alpha-chloroanthraquinone the steps which comprise chlorinating anthraquinone in approximately 3.6 parts of sulfuric acid monohydrate per part of anthraquinone in which is dissolved from 2.3 to 3 moles of sulfur trioxide per mole of anthraquinone, the chlorination being effected at temperatures of between 25° and 55° C. and the chlorination being stopped when an isolated test sample of the chlorinated material contains not more than approximately 36% chlorine and isolating the 1,4,5,8-tetrachloroanthraquinone from the chlorination mass which has been adjusted to from 95 to 98% acid.

6. In the process for preparing tetra-alpha-chloroanthraquinone the steps which comprise chlorinating anthraquinone containing not more than three atoms of chlorine already in alpha positions in the anthraquinone molecule in from 2.5 to 6 parts of sulphuric acid monohydrate per part of anthraquinone in which is dissolved at least 2.3 moles of sulfur trioxide per mole of anthraquinone, the chlorination being effected at temperatures below about 55° C. and the chlorination being stopped when an isolated test sample of the chlorinated material contains not more than approximately 36% chlorine, and isolating the resulting 1,4,5,8-tetrachloranthraquinone by recrystallization of the crude material from an organic solvent of the group consisting of nitrobenzene and chlorobenzenes.

EARL E. BEARD.